United States Patent
Liu et al.

(10) Patent No.: US 11,654,568 B2
(45) Date of Patent: May 23, 2023

(54) 3D MEASUREMENT MODEL AND SPATIAL CALIBRATION METHOD BASED ON 1D DISPLACEMENT SENSOR

(71) Applicant: Dalian University of Technology, Dalian (CN)

(72) Inventors: Wei Liu, Liaoning (CN); Bing Liang, Liaoning (CN); Mengde Zhou, Liaoning (CN); Kun Liu, Liaoning (CN); Yang Zhang, Liaoning (CN); Di Feng, Liaoning (CN); Xintong Jiang, Liaoning (CN); Likun Si, Liaoning (CN); Zhenyuan Jia, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 738 days.

(21) Appl. No.: 16/647,654

(22) PCT Filed: May 15, 2019

(86) PCT No.: PCT/CN2019/086948
§ 371 (c)(1),
(2) Date: Mar. 16, 2020

(87) PCT Pub. No.: WO2020/151134
PCT Pub. Date: Jul. 30, 2020

(65) Prior Publication Data
US 2021/0095959 A1   Apr. 1, 2021

(30) Foreign Application Priority Data

Jan. 24, 2019  (CN) .......................... 201910069437.3

(51) Int. Cl.
*B25J 9/16*   (2006.01)
*B25J 19/02*  (2006.01)
*G01B 21/04*  (2006.01)

(52) U.S. Cl.
CPC .......... *B25J 9/1692* (2013.01); *B25J 9/1694* (2013.01); *B25J 19/027* (2013.01); *G01B 21/042* (2013.01); *G01B 21/045* (2013.01)

(58) Field of Classification Search
CPC ...... B25J 9/1692; B25J 9/1694; B25J 19/027; G01B 21/042; G01B 21/045
(Continued)

(56) References Cited

U.S. PATENT DOCUMENTS

2014/0007441 A1 * 1/2014 Pettersson .............. G01B 5/008
33/503

FOREIGN PATENT DOCUMENTS

CN       1206105 A     1/1999
CN     107525472 A    12/2017
(Continued)

*Primary Examiner* — Aditya S Bhat
(74) *Attorney, Agent, or Firm* — Muncy, Geissler, Olds & Lowe, P.C.

(57) ABSTRACT

A 3D measurement model and the spatial calibration method based on a 1D displacement sensor are proposed. A 3D measurement system based on a fixed 1D displacement sensor is established; then a spatial measurement model based on the 1D displacement sensor is established; and then based on the high precision pose data of the measurement plane and sensor measurement data, spatial calibration constraint equation are established; a weighted iterative algorithms is employed to calculate the extrinsic parameters of the 1D sensor that meet the precision requirements, then the calibration process is completed. A high precision 3D measurement model is established; a 3D measurement model based on a 1D displacement sensor is established, and the calibration method of the measurement model is proposed, which will improve the precision of the 3D measurement model and solve the problem of inaccurate spatial measurement caused by the errors of the sensor extrinsic parameters.

1 Claim, 2 Drawing Sheets

(58) Field of Classification Search
USPC .......................................................... 702/95
See application file for complete search history.

(56) References Cited

FOREIGN PATENT DOCUMENTS

| CN | 108534650 A | 9/2018 |
| CN | 109032070 A | 12/2018 |

* cited by examiner

3D MEASUREMENT MODEL AND SPATIAL CALIBRATION METHOD BASED ON 1D DISPLACEMENT SENSOR

TECHNICAL FIELD

The invention belongs to the technical field of space measurement, and relates to a 3D measurement model and a space calibration method based on 1D displacement sensor.

BACKGROUND

With the rapid development of science and technology, the requirements for precision and efficiency in the field of production and measurement are getting higher and higher. In the field of aircraft assembly, it is very necessary to precisely measure the small changes in the spatial pose of each tooling part during the assembly process, which is an important factor to ensure the quality of aircraft assembly. However, the complexity and variety of aircraft tooling parts make it difficult to measure. And traditional contact measurement means have been unable to meet the current requirements. Thus, non-contact measurement means, with the characteristics of high precision and fast speed, have gradually become the focus in the field of measurement. In the field of robots, non-contact measurement means have also been widely used. The research of intelligent robots with the ability to sense the environment has become the current mainstream trend, non-contact measurement equipment such as laser displacement sensors, laser scanners, cameras, etc. are usually mounted on the robot end. Among them, the 1D displacement sensor for non-contact displacement measurement has extremely high precision in its measurement direction. To derive the spatial three-dimensional information of the target point from the measured distance value, it is necessary to combine the extrinsic parameters of the sensors, that is, the measurement origin and the measurement vector, to establish a 3D measurement model and then to perform spatial calibration on the measurement model. Thus, high precision measurement information is obtained, which is of great significance for improving the precision of 3D geometry detection.

To calibrate the extrinsic parameters of the sensor, Paul Michael Newman et al. of Oxford University proposed a calibration method for extrinsic parameters of 2D sensors mounted on a motion device in the patent "Determining extrinsic calibration parameters for a sensor" published in 2016 with the patent number US20140240690. This method collects pose data of the motion device and the sensor measurement data, generates point cloud data based on the sensor measurement data, establishes a covariance matrix between the point cloud data and the pose data, and maximizes the point cloud data quality function to determine the extrinsic parameters of the sensor. However, in this method, the sensor moves with the motion device and the extrinsic parameters need to be calibrated in combination with the 2D information of the 2D sensor, which is not applicable to the establishment of the space measurement model based on a fixed 1D displacement sensor.

To calibrate the measurement vector of the displacement sensor, Bi Chao et al. of Beijing Institute of Aeronautical Precision Machinery published the article "Calibration of laser beam direction for optical coordinate measuring system" in Volume 73 of Measurement. A non-contact coordinate measurement system combined with a laser displacement sensor is established, and the measurement vector is calibrated on a standard spherical surface. According to the calibration results, the measurement uncertainty of the built measurement system is about 0.030 mm. However, the method needs to calculate based on the movement information of the laser displacement sensor, which cannot be applied to the establishment of the space measurement model based on a fixed displacement sensor. To calibrate the measurement origin of displacement sensor, Yuan Peijiang et al. of Beijing University of Aeronautics and Astronautics proposed a position error calibration method of the laser displacement sensor in the patent "A laser displacement sensor position error calibration method" published in 2017 with the patent number CN201710941734.3. Through the data collection based on the laser tracker and the sensor, the installation position of the laser displacement sensor is calibrated by the least square method, which eliminates the precision reduction caused by the installation position error. In this method, the calibration of the installation position error is the same as the calibration of the measurement origin, however, the cost of the laser tracker is high, which makes this method not universally applicable.

SUMMARY

The technical problem to be solved by the present invention is the establishment and the spatial calibration of the 3D measurement model based on 1D displacement sensor. In order to overcome the shortcomings of the existing technology, a 3D measurement model and spatial calibration method based on a 1D displacement sensor are proposed. The method includes four steps: a 3D measurement system based on a fixed 1D displacement sensor is established; a spatial measurement model based on the 1D displacement sensor is established; constraint equations of the spatial calibration are established based on the high precision pose transformation of the measurement plane; and a weighted iterative algorithms is proposed to calculate the 1D sensor extrinsic parameters (measurement origin and the measurement vector) that meet the precision requirements and complete the calibration process. Thus, a 3D high precision measurement model is finally established. This method has a simple process and is easy to operate, which is applicable to a variety of fixed displacement sensors and is a method for establishing a 3D high precision measurement model with wide application prospects.

Technical Solution of the Present Invention

A 3D measurement model and the spatial calibration method based on a 1D displacement sensor are proposed. Firstly, a 3D measurement system based on a fixed 1D displacement sensor is established; then a spatial measurement model based on the 1D displacement sensor is established; and then based on the high precision pose data of the measurement plane and sensor measurement data, spatial calibration constraint equation are established; finally, a weighted iterative algorithms is employed to calculate the extrinsic parameters of the 1D sensor (the measurement origin and measurement vector) that meet the precision requirements, then the calibration process is completed. Finally, a high precision 3D measurement model is established.

Specific steps are as follows:

1. 3D measurement system based on the fixed 1D displacement sensor is established. Firstly, the displacement sensor is fixed on the frame for 3D information measurement, and its displacement measurement value is obtained through a data acquisition card; then the space calibration system is set up and the measurement plane is mounted on a hexapod, which is capable of 6-DOF motion; a workpiece coordinate system is established based on the hexapod, and the initial plane equation of the measurement plane in the workpiece coordinate system is determined as follows:

$$N_0 \square (xyz1)^T = 0 \tag{1}$$

where, $N_0$ is the plane equation parameter; then, the above-mentioned calibration system is moved into the measurement range of the displacement sensor by an extrinsic actuator, and the transformation relationship between the world coordinate system and the workpiece coordinate system is established by the extrinsic measurement system, which is used to transform subsequent calibration results to the world coordinate system;

2. The spatial measurement model based on a 1D displacement sensor is established. In the workpiece coordinate system, the measurement origin of the displacement sensor is defined as $O=[O_x\ O_y\ O_z]^T$, the unit measurement vector is defined as $t=[t_x\ t_y\ t_z]^T$, and the following relation holds:

$$\|t_2\| = t_x^2 + t_y^2 + t_z^2 = 1 \tag{2}$$

The measurement origin O and the measurement vector t are the extrinsic parameters of the displacement sensor to be calibrated.

From the above equations, the measurement points P in the workpiece coordinate system are:

$$P = (xyz)^T = O + \delta t \tag{3}$$

where, $\delta$ is the displacement value measured by the displacement sensor; according to equation (1), at the initial position, the point $P_0$ on the measurement plane satisfies:

$$N_0 \square (P_0 1)^T = 0 \tag{4}$$

3. Based on the high precision pose data of the measurement plane and the measurement data of the sensor, the spatial calibration constraint equations are established.

Multiple pose transformations are performed, and parameters $(l,m,n,\alpha,\beta,\gamma)$ for each pose transformation are recorded separately, where (l,m,n) represents the displacements along the X, Y, Z axes, $(\alpha,\beta,\gamma)$ represents the Euler angles rotated around the X, Y, Z axes; thus, the rotation matrix R and translation matrix T are expressed as:

$$R = \begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix} \tag{5}$$

$$T = (l\ m\ n)^T$$

After the ith pose transformation of the measurement plane, the point $P_i$ on the measurement plane satisfies:

$$N_i \square (P_i 1)^T = 0 \tag{6}$$

Meanwhile, according to equation (5), there is:

$$P_i = R_i \square P_0 + T_i \tag{7}$$

Combining equations (4) and (7), we can get:

$$N_i = N_0 \square \begin{pmatrix} R_i^{-1} & -R_i^{-1} T_i \\ 0 & 1 \end{pmatrix} \tag{8}$$

Substituting equations (3) and (8) into equation (6), the constraint equation is expressed as:

$$N_0 \square \begin{pmatrix} R_i^{-1} & -R_i^{-1} T_i \\ 0 & 1 \end{pmatrix} (O + \delta_i t\ 1)^T = 0 \tag{9}$$

where, O and t are the extrinsic parameters of the displacement sensor to be calibrated, $\delta_i$ is the measured value of the displacement sensor at the ith time, and the remaining variables are all known quantities. $R_i$ and $T_i$ are calculated from the pose transformation parameters $(l,m,n,\alpha,\beta,\gamma)$, and $N_0$ has been obtained in advance;

4. A weighted iterative algorithms is employed to calculate the extrinsic parameters of the 1D sensor (the measurement origin and measurement vector), that meet the precision requirements.

Due to the measurement and calculation errors, equation (9) cannot be zero, and iterative optimization is required to minimize its value;

Let $s=(O,t)=(O_x,O_y,O_z,t_x,t_y,t_z)$, equation (9) be expressed as:

$$\min \|f(s)\| \to 0 \tag{10}$$

where, $\varepsilon$ is the allowable error; Due to the different contribution to the overall error of each calibration sample, it is necessary to adjust the weight of each sample to avoid generating local solutions through over-optimization; equation (10) is converted into:

$$\|f_i(s)\| \leq \lambda_i \varepsilon \tag{11}$$

where $\lambda_i$ (i=1, 2, ..., M) is the weight coefficients and M is the number of samples; The optimization objective is constructed as follows, and the set of inequalities (11) is transformed into a minimum optimization problem:

$$\min G(s) = \frac{1}{2} \sum_{i=1}^{M} [g_i(s)]^2 = \frac{1}{2} g(s)^T g(s) \tag{12}$$

where, $$g_i(s) = \max\{\|f_i(s)\| - \lambda_i \varepsilon, 0\} \tag{13}$$

It can be seen from the sufficient and necessary that the solutions of equations (11) and (12) are equivalent; Then, the conventional LM iterative optimization algorithm is adopted, and the optimal solution is obtained:

$$s^* = \mathrm{argmin}_s \{G(s)\} \tag{14}$$

Through the above steps, the establishment and spatial calibration of the 3D measurement model based on the 1D displacement sensor in the workpiece coordinate system is completed, and the translation relationship between world coordinate system and workpiece coordinate system is used to transform the calibrated 3D measurement model to the world coordinate system.

The beneficial effect of the present invention is that the method designs a 3D measurement model and a spatial calibration method based on a 1D displacement sensor. Firstly, a 3D measurement system based on a fixed 1D displacement sensor is established; then the spatial measurement model based on the 1D displacement sensor is established; and then based on high precision pose data of the measurement plane and the measurement data of the sensor, spatial calibration constraint equations are established;

finally, a weighted iterative algorithms is employed to calculate the extrinsic parameters of the 1D sensor (the measurement origin and measurement vector), which meet the precision requirements. Thus, the calibration process is completed, and the 3D high precision measurement model is established. In this method, a 3D measurement model based on a 1D displacement sensor is established, and the calibration method of the measurement model is proposed, which will improve the precision of the 3D measurement model and solve the problem of inaccurate spatial measurement caused by the errors of the sensor extrinsic parameters. The method is simple, easy to operate, and has universal applicability.

In the figure: 1—the displacement sensor; 2—the measurement plane; 3—the measurement errors based on the weightless calibration results; 4—the measurement errors based on the weighted calibration results; 5—statistics of the measurement errors based on the weightless calibration results; 6—statistics of the measurement errors based on the weighted calibration results; O—the measurement origin of the displacement sensor; t—the measurement vector of the displacement sensor; δ—the measurement value of the displacement sensor; P—the measurement point.

DETAILED DESCRIPTION

Hereinafter, specific implementation of the present invention will be described with reference to the technical solutions and the drawings.

Figure 1:
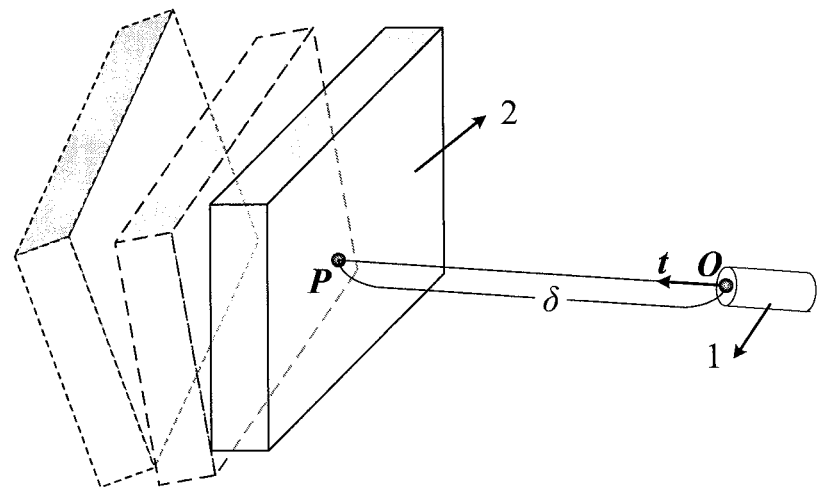
FIG. 1 is the schematic diagram of a 3D measurement model and spatial calibration principle based on the displacement sensor.

FIG. 1 is the schematic diagram of a 3D measurement model and spatial calibration principle based on the displacement sensor. The measurement plane is driven to rotate and translate by the high precision hexapod, which is capable of 6-DOF motion; and the motion parameters of pose were obtained to facilitate the subsequent calculation of the measurement plane equation. Meanwhile, based on the extrinsic parameters O and t of displacement sensor, the spatial measurement model was established and the displacement measurement value δ was obtained. By multiple pose transformations of the measurement plane, multiple sets of data are collected, and the calibration constraint equations are established. Finally, the weighted iteration algorithm is employed to complete the spatial calibration of the 3D measurement model.

Figure 2:
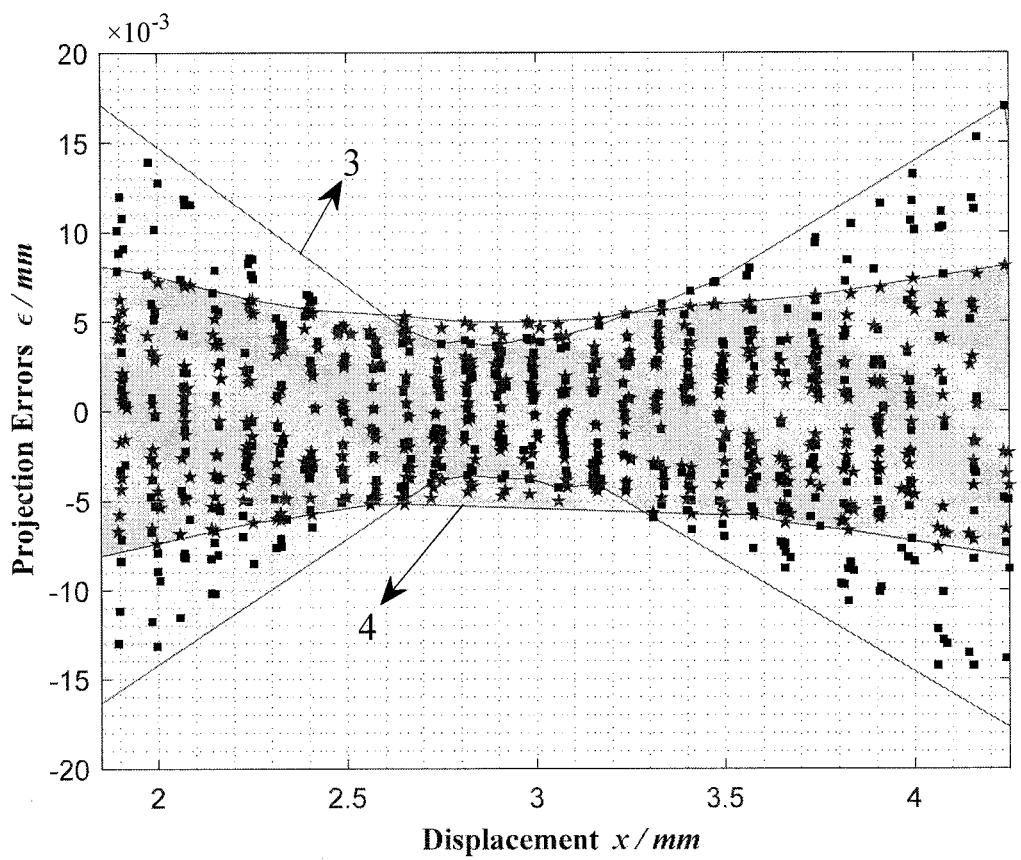
FIG. 2 is the error distribution diagram of the spatial measurement based on the calibration results of the extrinsic parameters of the displacement sensor.

FIG. 2 is the error distribution diagram of the spatial measurement based on the calibration results of the extrinsic parameters of the displacement sensor. The abscissa is the displacements measured by the displacement sensor, and the ordinate is the distance errors between the measurement points and the actual positions of the measurement plane.

Figure 3:
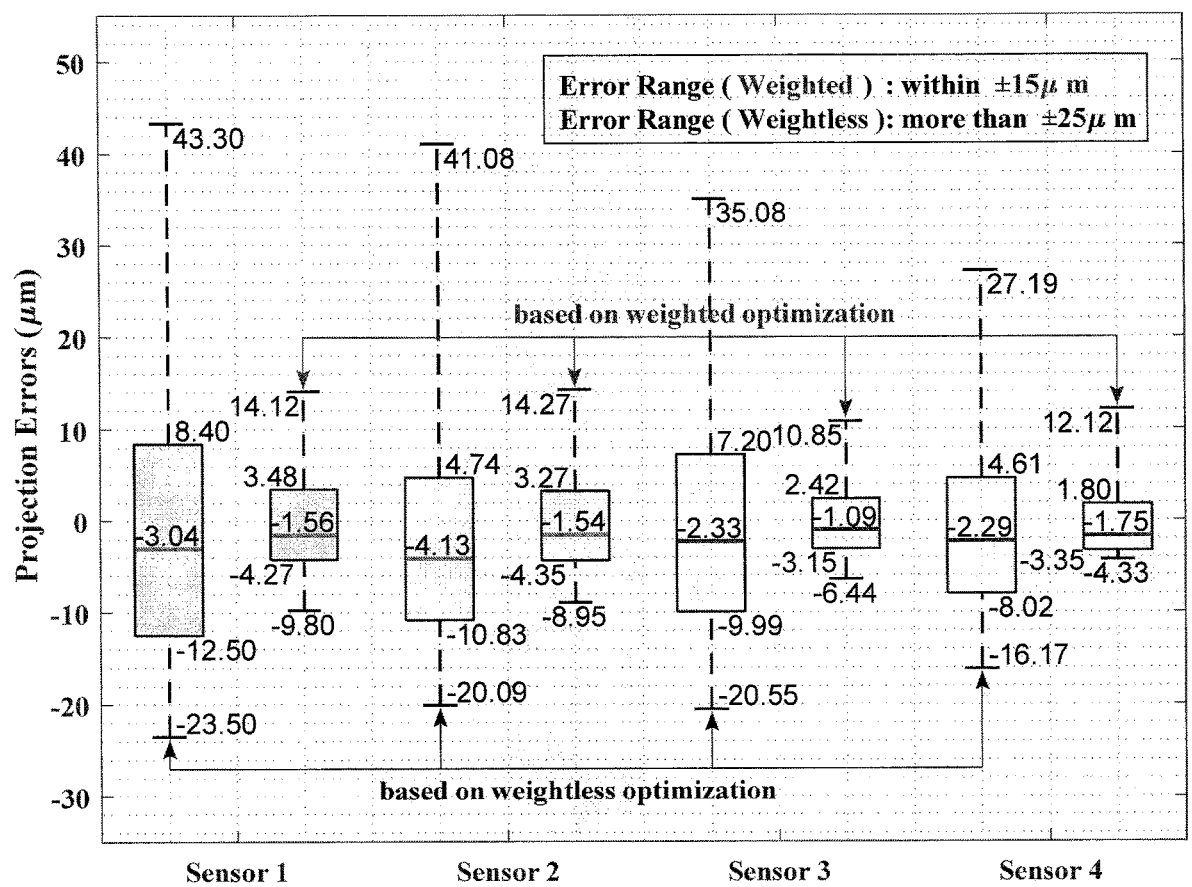
FIG. 3 is the error statistical diagram of spatial measurement based on the calibration results of the extrinsic parameters of the displacement sensor.

FIG. 3 is the error statistical diagram of spatial measurement based on the calibration results of the extrinsic parameters of the displacement sensor. The abscissa is the indices of the displacement sensors installed at different positions, and the ordinate is the distance errors between the measurement points and the actual positions of the measurement plane.

Specific steps are as follows:

1. A 3D measurement system based on a fixed 1D displacement sensor is established. First, the displacement sensor (Kaman, KD2306-6U1, measurement range: 0 mm-6 mm) is fixed on the frame for 3D information measurement, and its displacement measurement value is obtained through a data acquisition card; then the space calibration system is set up and the measurement plane is mounted on a hexapod, which is capable of 6-DOF motion; a workpiece coordinate system is established based on the hexapod, and the initial plane equation of the measurement plane in the workpiece coordinate system is determined as follows:

$$N_0 \Box (xyz1)^T = 0 \tag{15}$$

where, $N_0 = (0.027, -0.002, -1.000, 129.871)$ is the plane equation parameter; then, the above-mentioned calibration system is moved into the measurement range of the displacement sensor by an extrinsic actuator, and generally, the world coordinate system is established on the workpiece coordinate system:

$$R_W = \begin{pmatrix} 1 & 0 & 0 \\ 0 & 1 & 0 \\ 0 & 0 & 1 \end{pmatrix}, T_W = \begin{pmatrix} 0 \\ 0 \\ 0 \end{pmatrix} \tag{16}$$

where, $R_W$ and $T_W$ are the rotation and translation matrices between the workpiece coordinate system and the world coordinate system respectively.

By controlling the movement of the hexapod, which is connected to a computer, the measurement plane is driven to change the pose; finally, the measurement value δ of displacement sensor and the pose parameters (α,β,γ,l,m,n) are collected by the computer.

2. The spatial measurement model based on a 1D displacement sensor is established. In the workpiece coordinate system, the measurement origin of the displacement sensor is defined as $O=[O_x\ O_y\ O_z]^T$, the unit measurement vector is defined as $t=[t_x\ t_y\ t_z]^T$, and the following relation holds:

$$\|t\|_2 = t_x^2 + t_y^2 + t_z^2 = 1 \tag{17}$$

The measurement origin O and the measurement vector t are the extrinsic parameters of the displacement sensor to be calibrated;

From the above equations, the measurement points P in the workpiece coordinate system are:

$$P = (xyz)^T = O + \delta t \tag{18}$$

where, δ is the displacement value measured by the displacement sensor; according to equation (15), at the initial position, the point $P_0$ on the measurement plane satisfies:

$$N_0 \Box (P_0 1)^T = 0 \tag{19}$$

3. Based on the high precision pose data of the measurement plane and the measurement data of the sensor, the spatial calibration constraint equations are established.

Multiple pose transformations are performed, and parameters (l,m,n,α,β,γ) for each pose transformation are recorded separately, where (l,m,n) represents the displacements along the X, Y, Z axes, $(\alpha,\beta,\gamma)$ represents the Euler angles rotated around the X, Y, Z axes; thus, the rotation matrix R and translation matrix T are expressed as:

$$R = \begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix} \quad (20)$$

$$T = (l\ m\ n)^T$$

After the ith pose transformation of the measurement plane, the point $P_i$ on the measurement plane satisfies:

$$N_i \square (P_i 1)^T = 0 \quad (21)$$

Meanwhile, according to equation (20), there is:

$$P_i = P_i \square P_0 + T_i \quad (22)$$

Combining equations (19) and (22), we can get:

$$N_i = N_0 \square \begin{pmatrix} R_i^{-1} & R_i^{-1} T_i \\ 0 & 1 \end{pmatrix} \quad (23)$$

Substituting equations (18) and (23) into equation (21), the constraint equation is expressed as:

$$N_0 \square \begin{pmatrix} R_i^{-1} & -R_i^{-1} T_i \\ 0 & 1 \end{pmatrix} (O + \delta_i t\ 1)^T = 0 \quad (24)$$

where, O and t are the extrinsic parameters of the displacement sensor to be calibrated, $\delta_i$ is the measured value of the displacement sensor at the ith time, and the remaining variables are all known quantities. $R_i$ and $T_i$ are calculated from the pose transformation parameters (l,m,n,$\alpha,\beta,\gamma$), and $N_0$ has been obtained in advance; A total of 200 pose transformations are performed, and a portion of the data are shown in the table below.

| | | | Variable | | | |
|---|---|---|---|---|---|---|
| Index | $\alpha$ (°) | $\beta$ (°) | $\gamma$ (°) | l (mm) | m (mm) | n (mm) | $\delta$ (mm) |
| 1 | −0.1001 | −0.3001 | −0.1001 | −0.0001 | −1.5 | −1.0001 | 2.8998 |
| 2 | −0.5 | 0.0999 | −0.3 | −0.0001 | −1.0001 | −1.0001 | 2.7344 |
| 3 | 0.3001 | 0.3 | −0.5 | −1 | −1 | −2.0001 | 3.9877 |
| 4 | 0.4999 | 0.5001 | −0.0999 | −1 | −0.4999 | −1.5 | 3.4955 |
| 5 | 0.1 | 0.1 | −0.2998 | −0.001 | −5.001 | −1.5001 | 3.4885 |
| . | . | . | . | . | . | . | . |
| . | . | . | . | . | . | . | . |
| . | . | . | . | . | . | . | . |

4. A weighted iterative algorithms is employed to calculate the extrinsic parameters of the 1D sensor (the measurement origin and measurement vector), that meet the precision requirements.

Due to the measurement and calculation errors, equation (24) cannot be zero, and iterative optimization is required to minimize its value;

Let $s=(O,t)=(O_x,O_y,O_z,t_x,t_y,t_z)$, equation (24) be expressed as:

$$\min \|f(s)\| \to 0 \quad (25)$$

where, $\varepsilon$ is the allowable error; Due to the different contribution to the overall error of each calibration sample, it is necessary to adjust the weight of each sample to avoid generating local solutions through over-optimization; equation (25) is converted into:

$$\|f_i(s)\| \leq \lambda_i \varepsilon \quad (26)$$

Measurement plane touching the displacement sensor or the measured value exceeding the range of the displacement sensor will result in insufficiency of the calibration sample quantity near the range limit value and even far less than the calibration sample quantity near the range median value, which is easy to cause over optimization. Weight coefficient based on sample distribution is adopted:

$$\lambda_i = \max(c)/c_j, i \Rightarrow c_j (i=1,2,\ldots,200, j=1,2,\ldots,5) \quad (27)$$

where $\lambda_i$ is the weight coefficient of the ith sample. The overall calibration sample is divided into 5 groups according to the displacement measurement values for distribution statistics. $c_j$ is the size of the jth group, c is the vector composed of $c_j$, $i \Rightarrow c_j$ indicates that the ith sample belongs to the jth group. Sample distribution and weight coefficients of corresponding groups are as follows:

| Group Number | 1 | 2 | 3 | 4 | 5 |
|---|---|---|---|---|---|
| Sample Size | 13 | 61 | 57 | 59 | 10 |
| Weight | 4.6923 | 1.0000 | 1.0702 | 1.0339 | 6.1000 |

The optimization objective is constructed as follows, and the set of inequalities (26) is transformed into a minimum optimization problem;

$$\min G(s) \frac{1}{2} \sum_{i=1}^{M} [g_i(s)]^2 = \frac{1}{2} g(s)^T g(s) \quad (28)$$

where, $$g_i(s) = \max\{\|f_i(s)\| - \lambda_i \varepsilon, 0\} \quad (29)$$

It can be seen from the sufficient and necessary that the solutions of equations (26) and (28) are equivalent;

Then, the conventional LM iterative optimization algorithm is adopted, and the optimal solution is obtained:

$$s^* = \operatorname{argmin}_s \{G(s)\} \quad (30)$$

Through the above steps, four displacement sensors at different installation positions are calibrated, and the calibration results are as follows:

| Sensor No. | O/mm | t |
|---|---|---|
| 1 | [18.351, −132.296, 131.764] | [−0.001, 0.307, −0.949] |
| 2 | [−28.151, −135.772, 133.268] | [−0.031, 0.282, −0.955] |
| 3 | [29.461, 90.590, 132.799] | [0.037, 0.307, −0.951] |
| 4 | [−19.378, 91.536, 131.732] | [−0.053, 0.233, −0.971] |

5. Precision Verification of the Spatial Measurement Model

Based on the extrinsic parameters of the calibrated displacement sensor, the measurement plane placed in different positions is measured. According to the equation (18), the 3D coordinates of the measurement point are obtained, and the distance errors between the measurement points and the measurement plane are calculated, so as to verify the calibration precision.

From FIG. 2, it can be seen that at the middle of the range of displacement sensor (2.5 mm-3.5 mm), the measurement errors based on the weightless optimization calibration results are small, reaching within ±5 µm. Besides, near the limit position of the range of displacement sensor, the errors increase rapidly, exceeding ±15 µm. However, the measurement errors based on the weighted optimization calibration results can be within ±8 µm in the full measurement range.

According to the statistics of the measurement errors of the four sensors in FIG. 3, it can be seen that, compared with the measurement errors based on the weighted optimization calibration results and the measurement errors based on the weightless optimization calibration results, the mean value and error range of the measurement errors based on the weighted optimization calibration results are smaller, with the maximum error within ±15 µm. While the maximum value of the measurement errors based on the weightless optimization calibration results has exceeded ±25 µm. Therefore, the 3D measurement model and space calibration method based on the 1D sensor can reach high precision, which can provide higher precision guarantee for space measurement.

The invention claimed is:

1. A method of calibrating extrinsic parameters of a 1D displacement sensor by a 3D measurement model, wherein, firstly, a 3D measurement system based on a fixed 1D displacement sensor is established; then a spatial measurement model based on the 1D displacement sensor is established; and then based on precision pose data of a measurement plane and sensor measurement data, a spatial calibration constraint equation are established; finally, a weighted iterative algorithms is employed to calculate the extrinsic parameters of the 1D displacement sensor, the measurement origin and measurement vector, that meet precision requirements, then the calibration process is completed; finally, a precision 3D measurement model is established; the method comprising steps of:

step 1) establishing the 3D measurement system based on the fixed 1D displacement sensor:
wherein, first, the 1D displacement sensor is fixed on the frame for 3D information measurement, and its displacement measurement value is obtained through a data acquisition card; then the space calibration system is set up and the measurement plane is mounted on a hexapod, which is capable of 6-DOF motion; a workpiece coordinate system is established based on the hexapod, and the initial plane equation of the measurement plane in the workpiece coordinate system is determined as follows:

$$N_0 \cdot (xyz1)^T = 0 \quad (1)$$

where, $N_0$ is the plane equation parameter; then, the above-mentioned calibration system is moved into the measurement range of the 1D displacement sensor by an extrinsic actuator, and the transformation relationship between the world coordinate system and the workpiece coordinate system is established by the extrinsic measurement system, which is used to transform subsequent calibration results to the world coordinate system;

step 2) establishing the spatial measurement model based on the 1D displacement sensor:
wherein, in the workpiece coordinate system, the measurement origin of the displacement sensor is defined as $O = [O_x\ O_y\ O_z]^T$, the unit measurement vector is defined as $t = [t_x\ t_y\ t_z]^T$, and the following relation holds:

$$\|t_2\| = t_x^2 + t_y^2 + t_z^2 = 1 \quad (2)$$

the measurement origin O and the measurement vector t are the extrinsic parameters of the 1D displacement sensor to be calibrated;

from the above equations, the measurement points P in the workpiece coordinate system are:

$$P = (xyz)^T = O + \delta t \quad (3)$$

where, $\delta$ is the displacement value measured by the 1D displacement sensor; according to equation (1), at the initial position, the point $P_0$ on the measurement plane satisfies:

$$N_0 \cdot (P_0 1)^T = 0 \quad (4)$$

step 3) based on the precision pose data of the measurement plane and the measurement data of the 1D displacement sensor, establishing the spatial calibration constraint equations:

wherein, multiple pose transformations are performed, and parameters $(l,m,n,\alpha,\beta,\gamma)$ for each pose transformation are recorded separately, where $(l,m,n)$ represents the displacements along the X, Y, Z axes, $(\alpha,\beta,\gamma)$ represents the Euler angles rotated around the X, Y, Z axes; thus, the rotation matrix R and translation matrix T are expressed as:

$$R = \begin{pmatrix} 1 & 0 & 0 \\ 0 & \cos\alpha & -\sin\alpha \\ 0 & \sin\alpha & \cos\alpha \end{pmatrix} \begin{pmatrix} \cos\beta & 0 & \sin\beta \\ 0 & 1 & 0 \\ -\sin\beta & 0 & \cos\beta \end{pmatrix} \begin{pmatrix} \cos\gamma & -\sin\gamma & 0 \\ \sin\gamma & \cos\gamma & 0 \\ 0 & 0 & 1 \end{pmatrix} \quad (5)$$

$$T = (l\ m\ n)^T$$

after the ith pose transformation of the measurement plane, the point $P_i$ on the measurement plane satisfies:

$$N_i \cdot (P_i 1)^T = 0 \quad (6)$$

meanwhile, according to equation (5), there is:

$$P_i = R_i \cdot P_0 + T_i \quad (7)$$

combining equations (4) and (7), we can get:

$$N_i = N_0 * \begin{pmatrix} R_i^{-1} & -R_i^{-1} T_i \\ 0 & 1 \end{pmatrix} \quad (8)$$

substituting equations (3) and (8) into equation (6), the constraint equation is expressed as:

$$N_0 * \begin{pmatrix} R_i^{-1} & -R_i^{-1} T_i \\ 0 & 1 \end{pmatrix} (O + \delta_i t\ 1)^T = 0 \quad (9)$$

where, O and t are the extrinsic parameters of the 1D displacement sensor to be calibrated, $\delta_i$ is the measured value of the 1D displacement sensor at the ith time, and the remaining variables are all known quantities; $R_i$ and $T_i$ are calculated from the pose transformation parameters $(l,m,n,\alpha,\beta,\gamma)$, and $N_0$ has been obtained in advance;

step 4) employing a weighted iterative algorithms to calculate the extrinsic parameters of the 1D sensor that meet the precision requirements:

wherein, due to the measurement and calculation errors, equation (9) cannot be zero, and iterative optimization is required to minimize its value;

let $s=(O,t)=(O_x,O_y,O_z,t_x,t_y,t_z)$, equation (9) be expressed as:

$$\min \|f(s)\| \to 0 \quad (10)$$

where, $\varepsilon$ is the allowable error; due to the different contribution to the overall error of each calibration sample, it is necessary to adjust the weight of each sample to avoid generating local solutions through over-optimization; equation (10) is converted into:

$$\|f_i(s)\| \le \lambda_i \varepsilon \quad (11)$$

where $\lambda_i$ (i=1, 2, ..., M) is the weight coefficients and M is the number of samples;

the optimization objective is constructed as follows, and the set of inequalities (11) is transformed into a minimum optimization problem:

$$\min G(s) = \frac{1}{2}\sum_{i=1}^{M}[g_i(s)]^2 = \frac{1}{2}g(s)^T g(s) \quad (12)$$

where, $$g_i(s) = \max\{\|f_i(s)\| - \lambda_i \varepsilon, 0\} \quad (13)$$

it can be seen from the sufficient and necessary that the solutions of equations (11) and (12) are equivalent;

then, the conventional LM iterative optimization algorithm is adopted, and the optimal solution is obtained:

$$s^* = \operatorname{argmin}_s\{G(s)\} \quad (14)$$

through the above steps, the establishment and spatial calibration of the 3D measurement model based on the 1D displacement sensor in the workpiece coordinate system is completed, and the translation relationship between world coordinate system and workpiece coordinate system is used to transform the calibrated 3D measurement model to the world coordinate system.

* * * * *